United States Patent [19]

Wetzinger

[11] Patent Number: 4,650,256

[45] Date of Patent: Mar. 17, 1987

[54] APPARATUS FOR RETAINING A TOOL IN MACHINERY

[75] Inventor: Johann Wetzinger, Telfes, Austria

[73] Assignee: Betek Bergbau-und Hartmetalltechnik Karl-Heinz Simon GmbH & Co. KG, Fed. Rep. of Germany

[21] Appl. No.: 772,359

[22] Filed: Sep. 4, 1985

[30] Foreign Application Priority Data

Sep. 19, 1984 [DE] Fed. Rep. of Germany ....... 3434359

[51] Int. Cl.⁴ ..................... E21C 25/12; E21C 35/18
[52] U.S. Cl. .................................. 299/92; 403/381
[58] Field of Search .................................. 299/91–93; 37/142 R, 142 A; 403/381, 105, 331

[56] References Cited

U.S. PATENT DOCUMENTS

| | | | |
|---|---|---|---|
| 1,831,613 | 11/1931 | Symons | 403/105 X |
| 3,039,340 | 6/1962 | Livermont | 403/331 X |
| 3,666,321 | 5/1972 | Lundstrom et al. | 299/93 |
| 3,722,932 | 3/1973 | Dougall | 37/142 A X |
| 3,982,339 | 9/1976 | Nilsson | 37/142 R X |
| 4,019,298 | 4/1977 | Johnson IV | 403/331 X |
| 4,267,653 | 5/1981 | Hahn et al. | 37/142 A X |
| 4,275,929 | 6/1981 | Krekeler | 299/91 |
| 4,343,516 | 8/1982 | Aden | 299/91 X |
| 4,542,943 | 9/1985 | Montgomery, Jr. | 299/93 |

FOREIGN PATENT DOCUMENTS 2136481  9/1984  United Kingdom ................. 299/91

Primary Examiner—Stephen J. Novosad
Assistant Examiner—Michael A. Goodwin
Attorney, Agent, or Firm—Thomas W. Speckman; Ann W. Speckman

[57] ABSTRACT

An apparatus for holding a tool in machinery and having a tool holder connectable to the machine, with a cylindrical receptacle into which the cylindrical shaft of a tool is inserted rotatably and removably. The tool holder is detachably and rigidly connectable by an improved self-locking dovetail connection to a base plate which is rigidly connected to the machine. The base plate or the tool holder is provided in the area of the dovetail connection with arrest serrations running transverse to the insertion direction and on the opposing tool holder or base plate, oriented adjacent to the arrest serrations, there is installed a spring-loaded holding bolt or a stop spring which engages either with the arrest serrations of the base plate or of the tool holder, respectively, and enhances the connection between the base plate and the tool holder.

20 Claims, 9 Drawing Figures

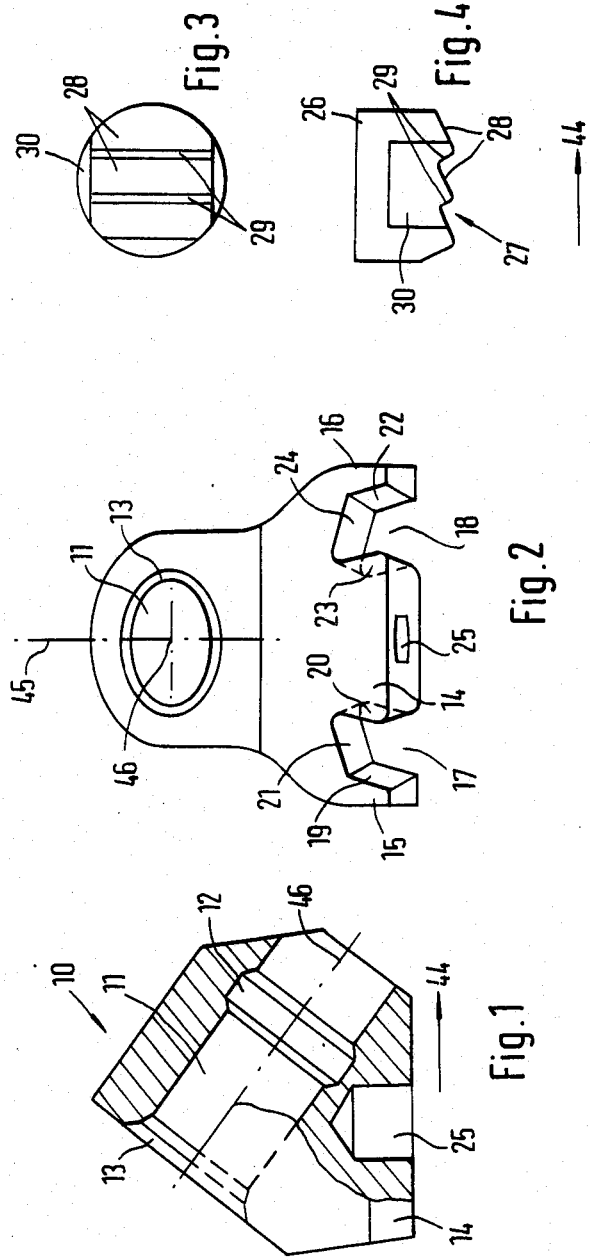

APPARATUS FOR RETAINING A TOOL IN MACHINERY

BACKGROUND OF THE INVENTION

1. Field of the Invention

The present invention relates to an apparatus for retaining a tool in cutting and drilling machinery and the like, especially for propulsion and production machinery, comprising a tool holder which may be fastened to the machine and having a cylindrical accommodation into which a cylindrical tool shaft may be inserted and retained rotatably and removably. The tool holder is detachably and rigidly connectable to a base plate which is rigidly connected to the machine whereby the releasable connection between the tool holder and the base plate is provided by a self-locking dovetail connection wherein the dovetail tenon and the dovetail groove taper in the insertion direction at a small angle to provide self-locking; and the plane of connection between the tool holder and base plate is oriented with respect to the central axis of the receptacle so that when the tool is stressed, at least one force component acts in the insertion direction to enhance the self-locking connection.

2. Description of the Prior Art

Tool holders are known which are usually welded to the machine, such as taught by German Patent Publication Nos. DE-OS 26 30 276 and DE-OS 33 46 014. German Patent Publication No. DE-OS 33 12 514 and U.S. Pat. No. 3,749,449 show attachment of a tool holder to a machine in a detachable manner using screws or bolts.

Tool holders are known in which various embodiments differ especially in the holding and the positioning of the tool in the tool holder, as described, for example, in German Patent Publication No. DE-OS 33 12 514. Replacement of the tool holder in this prior art device is always in addition very time consuming and expensive, since in order to achieve rigidity with the base plate, additional tight screwing is necessary.

This prior art device does make it possible to replace the tool holder without severing and welding operations, but the tool holder has a certain amount of play in the area of the screw or bolt attachment which leads to the misalignment of interconnected parts during machine operation which places constant stress on the tool, so that, in addition to the tool holder, the part attached to the machine with the connected base plate must be replaced from time to time. The advantage of the detachable connection of the tool to the machine is therefore limited, since the stress is shifted to the part rigidly connected to the machine with the base plate.

SUMMARY OF THE INVENTION

An objective of the present invention is to provide an apparatus of the general type described above, in which the tool holder can be easily replaced, but in which a play-free and rigid connection to the machine is provided which is not misaligned during operation of the machine.

This objective is achieved by the present invention as follows: the base plate or the tool holder is provided in the area of the dovetail connection with arrest serrations running transverse to the insertion direction and that on the other piece, the tool holder or the base plate, oriented to engage an arrest serration there is installed a spring loaded holding bolt or a stop spring which engages either with an arrest serration of the base plate or of the tool holder and provides additional connection between the base plate and the tool holder.

The self-locking connection between the tool holder and the base plate, with this additional arresting and orientation of the dovetail connection, is improved so that forces are exerted in a direction which enhances the locking between the dovetail tenon and the groove when the tool is stressed, so that a rigid connection which is free of play is achieved and maintained which, despite easy releasability by means of correspondingly opposed force, is not misaligned under severe operating stresses. In addition, manufacturing tolerances of the arresting dovetail connection are automatically compensated for when appropriate angles required for the self-locking dovetail connection are provided.

One preferred embodiment provides the dovetail groove in the top side of the base plate and the dovetail tenon on the underside of the tool holder between two aprons which cover, at least partially, opposing side walls of the base plate oriented parallel to the dovetail groove.

This embodiment having aprons has the additional advantage that the dovetail connection is covered and protected.

To compensate for any play or movement directed vertically to the fastening direction, another embodiment provides that the surfaces of the tool holder adjacent the side walls of the dovetail tenon are at an acute angle to the side walls corresponding to the acute angle at which the surfaces of the base plate are oriented to the side walls of the dovetail groove. The stress on the side walls of the dovetail groove caused by the laterally directed clamping forces is partially compensated for by the inclined surfaces and contact surfaces of the tool holder and base plate.

If, according to another embodiment, the dovetail connection is symmetrical to a central plane through the central axis of the receptacle and perpendicular to the plane of connection, then tool stress is also transmitted symmetrically to the dovetail connection.

If the tool is desired to be removable from the receptacle without loosening the connection between the tool holder and the base plate, then another embodiment is provided wherein the dovetail tenon of the tool holder has a blind hole perpendicular to the plane of connection in which a holding bolt with a serrated surface is held spring loaded and is non-rotatable and undetachable, and that in the bottom of the dovetail groove of the base plate an arrest element is provided with a serrated surface on which the serrated surface of the holding bolt catches. With this additional connection between the holding bolt and the arrest element in the base plate, the force required to release the tool holder from the base plate is considerably increased and may be definitely greater than the force required to release the tool from the receptacle of the tool holder.

Achieving the connection when attaching the tool to the base plate is facilitated by the fact that the serrations of the holding bolt and of the arrest element are provided with teeth directed transverse to the insertion direction, the forward tooth flanks on the holding bolt being flatter than the rear tooth flanks, while on the arrest element the forward tooth flanks in the insertion direction are flatter than the rear tooth flanks. The non-rotatable and undetachable attachment of the holding bolt to the tool holder is achieved in a simple embodiment by providing the holding bolt in its upper serrated area with lateral flattened areas and retaining the holding bolt unmovable and non-rotatable in the blind hole by means of deformed wall areas in the blind hole of the tool holder which mate with the flattened areas of the holding bolt.

Rigid and secure attachment of the base plate to machinery is simplified in one embodiment by providing that the underside of the base plate is circularly concave in the insertion direction.

Covering and protection of the dovetail connection by the aprons of the tool holder is improved by adjusting the distance between the two aprons to the transverse dimension of the base plate, which is constant in the plane of connection or decreases in accordance with the transverse dimensions of the dovetail tenon.

Another type of holding or arresting device is provided by an embodiment in which in the area of the dovetail connection the arrest serrations are form-shaped in one piece on the dovetail tenon of the base plate and a stop spring is attached by means of a fastening bolt to the adjacent surface of the dovetail groove of the tool holder.

At the same time, for the better locating or arresting by the stop spring, the stop spring is installed in the dovetail groove of the tool holder oriented opposite to the insertion direction and a bent-free end of the stop spring engages in an arrest serration running transverse to the insertion direction.

BRIEF DESCRIPTION OF THE DRAWINGS

The present invention is described in further detail with reference to embodiments represented in the drawings, wherein:

FIG. 1 shows a side view of a tool holder, partially in cross section;

FIG. 2 shows a front view of the tool holder with a receptacle for retaining a tool;

FIG. 3 shows an enlarged view of a holding bolt with serrations for insertion into the blind hole of the tool holder shown in FIGS. 1 and 2;

FIG. 4 shows a side view of the holding bolt of FIG. 3;

DESCRIPTION OF PREFERRED EMBODIMENTS

Figure 7:
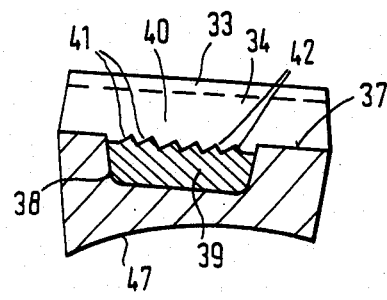
FIG. 7 shows a longitudinal sectional view of the base plate along line VII—VII of FIG. 5.
Figure 5:
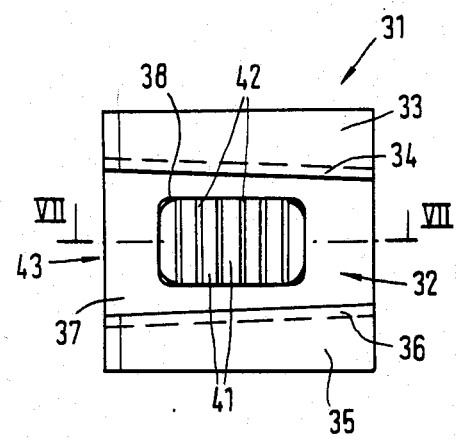
FIG. 5 shows a top view of a base plate with a dovetail groove.
Figure 6:
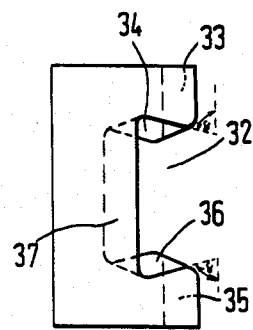
FIG. 6 shows a view of the base plate from the insertion side of the dovetail groove.

The apparatus comprises a tool holder 10 as shown in FIGS. 1–4 and a base plate 31 as shown in FIGS. 5–7. One advantage of the present apparatus is that base plate 31 is securely attached and may remain attached to the machine. Not only is the tool removable from receptacle 11 of the tool holder, but tool holder 10 is also removable from base plate 31, and yet no separate appliance is required to connect tool holder 10 detachably to base plate 31.

FIG. 1 shows cylindrical receptacle 11 in cross section and provided on the insertion side with a widening taper insertion opening 13 and having a circular interior groove 12 in which a rotating ring bearing on the tool shaft is held. This connection is provided in a known manner as a resting connection. Central axis 46 of receptacle is at an acute angle to the underside of tool holder 10 that defines the plane of connection with the base plate, the insertion direction indicated by arrow 44.

As the front view of FIG. 2 shows, the bottom of tool holder 10 has dovetail tenon 14 which tapers continuously in the insertion direction. The taper angle is small to achieve self-locking with dovetail groove 32 in the top of base plate 31. Dovetail tenon 14 becomes narrower as the distance from receptacle 11 decreases. The result is that when the tool inserted in receptacle 11 is stressed, the clamping connection between dovetail tenon 14 and dovetail groove 32 is established more firmly and free of play compensating for the manufacturing tolerances of the dovetail connection. Tenon 14 and groove 32 are symmetrical to central plane 45 that is perpendicular to connection plane 43 which intersects central axis 46 of receptacle 11, so that the forces acting on the tool are transmitted symmetrically to the dovetail connection.

Sides 20 and 23 of dovetail tenon 14 extend at an acute angle to surfaces 21 and 24 of tool holder 10, just as sides 34 and 36 of base plate 31 extend at an acute angle $\alpha$ from contact surfaces 33 and 35. This results in tightening forces which are exerted on sides 34 and 36 of dovetail groove 32 through surfaces 21 and 24 of the tool holder 10 contacting surfaces 33 and 35 of base plate 31.

Two aprons 15 and 16 may be arranged on the bottom of tool holder 10 which partially embrace base plate 31 and therefore cover and protect the dovetail connection. Inner surfaces 19 and 22 of aprons 15 and 16 may be provided having a constant distance from each other corresponding to the transverse dimension of base plate 31. Inner surfaces 19 and 22 may also, however, as the embodiment of FIG. 2 shows, extend parallel to sides 20 and 23 of dovetail tenon 14. Base plate 31, according to this embodiment, has corresponding continuously diminishing transverse width and a corresponding inclination of its outer walls. Aprons 15 and 16 may thus also support the outer walls of dovetail groove 32 which are retained by slots 17 and 18 between tenon 14 and the two aprons 15 and 16.

As FIG. 7 shows, the bottom of base plate 31 in the direction of insertion may be provided with concave surface 47, since base plate 31 is attached, for example, welded, to a convex working surface.

Secure attachment of tool holder 10 in the base plate 31 may be improved by means of an additional connecting means in the insertion direction between holding bolt 26 and arrest element 39. Holding bolt 26 shown in FIGS. 3 and 4 is retained spring-loaded, non-rotatable and undetachable in blind hole 25 of tenon 14. Holding bolt 26 has transversely directly serrations 27, wherein, at the front end, front tooth flanks 28 facing in the insertion direction are flatter than rear tooth flanks 29. Holding bolt 26 may have lateral flattened portions 30 in its upper area above the serrations. Installation of a spring element and insertion of holding bolt 26 in blind hole 25, is facilitated when portions of the side wall of blind hole 25 are deformed in the area of the flattened portions of holding bolt 26, as shown in FIG. 2, with transversely directed serration 27 sufficiently for holding bolt 26 to be retained non-rotatably and undetachably. Holding bolt 26, when it has overcome the resilience of the spring in blind hole 25, may be displaced axially to a limited degree.

In groove bottom 37 of dovetail groove 32 of base plate 31 recess 38 may be provided with arrest element 39 which is oriented transversely with its arrest serration. In the insertion direction, which runs with the taper of dovetail groove 32, front tooth flanks 41 are again flatter than rear tooth flanks 42 so that upon insertion the secure connection is easily established but difficult to release. By means of this connection between holding bolt 26 of tool holder 10 and arrest element 39 of base plate 31, the attachment of tool holder 10 to base plate 31 is improved so that the retaining force considerably exceeds the force required to release the tool from receptacle 11. The tool may then be changed without removing tool holder 10 from base plate 31. The connection between the tool holder 10 and base plate 31 may be disengaged if necessary, however, by application of a corresponding releasing force opposite to the insertion direction, to enable replacement of tool holder 10.

Figure 8:
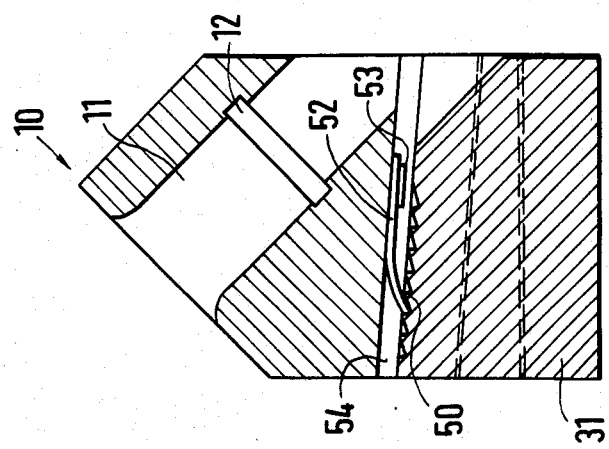
FIG. 8 shows a longitudinal sectional view of another embodiment of an arresting device between the tool holder and the base plate.
Figure 9:
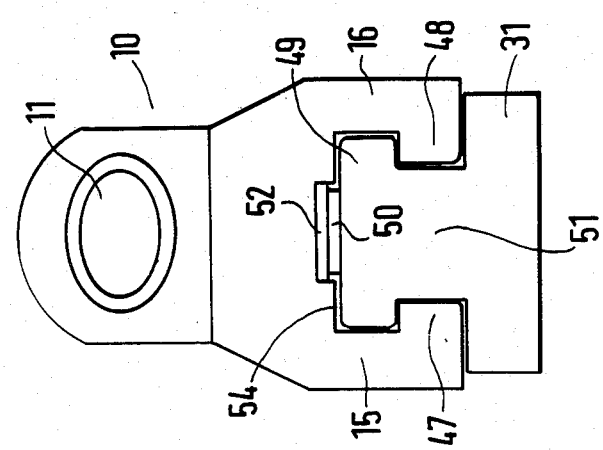
FIG. 9 shows a view of the joining of the base plate with the arresting tool holder shown in FIG. 8.

The embodiment of FIGS. 8 and 9 exemplifies another type of locking between tool holder 10 and base plate 31. The dovetail tenon 51 of base plate 31 has a T-shaped cross section, as the cross-bar with arrest serrations 50 shows. The formation and orientation of the teeth of arrest serrations 50 correspond to the design shown in FIGS. 5 and 7. The dovetail groove 54 of tool holder 10 is bounded by the aprons 15 and 16 provided with the inner-directed projections 47 and 48. Stop spring 52 is attached to the bottom of the groove facing the arrest serrations 50 in such a manner that its free end is oriented across the insertion direction. The attachment of stop spring 52 is by means of fastening bolt 53. The bent free end of stop spring 52 engages in arrest serrations 50 of base plate 31 so that the connection between tool holder 10 and base plate 31 is further enhanced. Upon the stressing of the tool, which is inserted in receptacle 11, not only the self-locking of the dovetail connection, but also the arrest connection provide that a tight, play-free connection is established between tool holder 10 and base plate 31. When tool holder 10 is to be released from base plate 31, then the arrest connection would be released by force, whereupon the fastening bolt 53 could be broken off. This does not matter, since tool holder 10 is replaced by a new tool holder. It is also possible for stop spring 52 to be broken. The tool holder 10 can in any case be released from the base plate and replaced.

I claim:

1. Apparatus for retaining a tool in machinery, said apparatus comprising a base plate and a tool holder having a cylindrical receptacle into which a cylindrical tool shaft may be inserted rotatably and removably wherein said tool holder is detachably connectable to said base plate which is rigidly connectable to the machine, said tool holder and said base plate in combination providing a self-locking dovetail connection in which a dovetail tenon and a dovetail groove taper correspondingly in an insertion direction to provide a detachable, self-locking connection between said tool holder and said base plate, whereby when said tool is stressed, at least one force component acts in said insertion direction and enhances said self-locking connection, characterized by said dovetail groove (32) being provided in the top of said base plate (31) and said dovetail tenon (14) being located on the bottom of said tool holder (10) between two extending aprons (15, 16) spaced in opposite directions from said tenon (14) forming slots (17, 18) between said dovetail tenon (14) and each said apron (15, 16), said aprons partially covering opposing side walls of said base plate (31) oriented parallel to said dovetail groove (32) when said tool holder 910) is connected to said base plate (31), and wherein one of said base plate (31) and said tool holder (10) is provided in the area of said dovetail connection with arrest serrations (40) running transverse to said insertion direction and the other of said tool holder (10) and said base plate (31) is provided with a spring-loaded holding bolt (26) oriented to engage with said arrest serrations (40), thereby providing an additional connection between said base plate (31) and said tool holder (10) oriented in a plane perpendicular to said insertion direction.

2. Apparatus as described in claim 1, characterized by tool holder surfaces (21, 24) forming the top of said slots (17, 18) being adjacent to sides (20, 23) of said dovetail tenon (14) and being at an acute angle to said sides (20, 23) corresponding to an acute angle at which base plate terminal contact surfaces (33, 35) oriented parallel to said tool holder surfaces (21, 24) when said tool holder (10) is connected to said base plate (31) are oriented to sides (34, 36) of said dovetail groove (32).

3. Apparatus as described in claim 2, characterized by said dovetail connection being oriented symmetrically to a central plane (45) extending through a central axis (46) of said receptacle (11) and perpendicular to a connection plane.

4. Apparatus as described in claim 2, characterized by said dovetail tenon (14) having a blind hole (25) perpendicular to a connection plane in which a holding bolt (26) is retained spring-loaded, non-rotatable and undetachable, said holding bolt (26) having a serrated end portion (27), and said dovetail groove (32) being provided in groove bottom (37) with an arrest element (39) having an upper face serrated portion (40) matable with said serrations of said holding bolt (26), all said serrations being transverse to said insertion direction (44).

5. Apparatus as described in claim 3, characterized by said dovetail tenon (14) having a blind hole (25) perpendicular to said connection plane in which a holding bolt (26) is retained spring-loaded, non-rotatable and undetachable, said holding bolt (26) having a serrated end portion (27), and said dovetail groove (32) being provided in groove bottom (37) being provided in groove bottom (37) with an arrest element (39) having an upper face serrated portion (40) matable with said serrations of said holding bolt (26), all said serrations being transverse to said insertion direction (44).

6. Apparatus as described in claim 5, characterized by said serrated portions (27) of said holding bolt (26) having front tooth flanks (28) facing the insertion direction (44) flatter than adjacent rear tooth flanks (29) and said arrest element (39) having serrations (40) with front tooth flanks (41) facing the insertion direction (43) flatter than adjacent rear tooth flanks (42).

7. Apparatus as described in claim 5, characterized by said holding bolt (26) having lateral flattened portions (30) adjacent said serrated end portion (27) and said blind hole (25) of said tool holder (10) having flattened portions matching said flattened portions (30) of said holding bolt (26) to retain said holding bolt (26) non-rotatably and undetachably in said blind hole (25).

8. Apparatus as described in claim 5, characterized by the distance between said two aprons (15, 16) corresponding to a distance between two opposing side walls of said base plate (31).

9. Apparatus as described in claim 6, characterized by said holding bolt (26) having lateral flattened portions (30) adjacent said serrated end portion (27) and said blind hole (25) of said tool holder (10) having flattened portions matching said flattened portions (30) of said holding bolt (26) to retain said holding bolt (26) non-rotatably and undetachably in said blind hole (25).

10. Apparatus as described in claim 9, characterized by the bottom of said base plate (31) being circularly concave in the insertion direction.

11. Apparatus as described in claim 1, characterized by the distance between said two aprons (15, 16) corresponding to a distance between two opposing side walls of said base plate (31).

12. Apparatus as described in claim 11, characterized by tool holder surfaces (21, 24) forming the top of said slots (17, 18) being adjacent to sides (20, 23) of said dovetail tenon (14) and being at an acute angle to said sides (20, 23) corresponding to an acute angle at which base plate terminal contact surfaces (33, 35) oriented parallel to said tool holder surfaces (21, 24) when said tool holder (10) is connected to said base plate (31) are oriented to sides (34, 36) of said dovetail groove (32).

13. Apparatus as described in claim 1, characterized by said dovetail connection being oriented symmetrically to a central plane (45) extending through a central axis (46) of said receptacle (11) and perpendicular to a connection plane.

14. Apparatus as described in claim 1, characterized by said dovetail tenon (14) having a blind hole (25) perpendicular to a connection plane in which a holding bolt (26) is retained spring-loaded, non-rotatable and undetachable, said holding bolt (26) having a serrated end portion (27), and said dovetail groove (32) begin provided in groove bottom (37) with an arrest element (39) having an upper face serrated portion (40) matable with said serrations of said holding bolt (26), all said serrations being transverse to said insertion direction (44).

15. Apparatus as described in claim 1, characterized by the bottom of said base plate (31) being circularly concave in the insertion direction.

16. Apparatus for retaining a tool in machinery, said apparatus comprising a base plate and a tool holder having a cylindrical receptacle into which a cylindrical tool shaft may be inserted rotatably and removably wherein said tool holder is detachably connectable to said base plate which is rigidly connectable to the machine, said tool holder and said base plate in combination providing a self-locking dovetail connection in which a dovetail tenon and a dovetail groove taper correspondingly in an insertion direction to provide a detachable, self-locking connection between said tool holder and said base plate, whereby when said tool is stressed, at least one force component acts in said insertion direction and enhances said self-locking connection, characterized by said dovetail groove (32) being provided in the top of said base plate (31) and said dovetail tenon (14) being located on the bottom of said tool holder (10) between two extending aprons (15, 16) spaced in opposite directions from said tenon (14) forming slots (17, 18) between said dovetail tenon (14) and each said apron (15, 16), said aprons partially covering opposing side walls of said base plate (31) oriented parallel to said dovetail groove (32) when said tool holder (10) is connected to said base plate (31), and wherein one of said base plate (31) and said tool holder (10) is provided in the area of said dovetail connection with arrest serrations (50) running transverse to said insertion direction and the other of said tool holder (10) and said base plate (31) is provided with a stop spring (52) oriented to engage with said arrest serrations (50), thereby providing an additional connection between said base plate (31) and said tool holder (10).

17. Apparatus as described in claim 16, characterized by said stop spring (52) being attached to a surface of said dovetail groove by a fastening bolt (53).

18. Apparatus as described in claim 16, characterized by said stop spring (52) having a free end transverse to said insertion direction and bent toward said arrest serrations (50) for engagement therewith.

19. Apparatus as described in claim 16, characterized by said stop spring (52) being attached to a surface of said dovetail groove of said tool holder (10) by a fastening bolt (53), said stop spring (52) having a free end transverse to the insertion direction and bent toward said arrest serrations (50) on said base plate (31) for engagement therewith.

20. Apparatus as described in claim 19, characterized by said arrest serrations (50) having front tooth flanks (41) facing insertion direction (43) flatter than adjacent rear tooth flanks (42).

* * * * *